United States Patent [19]

Holzl

[11] Patent Number: 4,591,514
[45] Date of Patent: May 27, 1986

[54] METHOD FOR MAKING SELF-PROTECTING CARBON BODIES

[75] Inventor: Robert A. Holzl, La Canada, Calif.

[73] Assignee: Air Products and Chemicals, Inc., Allentown, Pa.

[21] Appl. No.: 701,065

[22] Filed: Feb. 13, 1985

Related U.S. Application Data

[62] Division of Ser. No. 416,628, Sep. 10, 1982, Pat. No. 4,515,860.

[51] Int. Cl.$^4$ .................. C23C 16/32; C23C 16/34
[52] U.S. Cl. .................................. 427/249; 427/113; 427/255.2; 427/255.3; 427/255.7; 427/419.1; 427/419.7
[58] Field of Search ............... 427/249, 255.2, 255.3, 427/255.7, 113, 402, 419.2, 419.1, 419.7, 248.1; 428/408, 446

[56] References Cited

U.S. PATENT DOCUMENTS

| | | | |
|---|---|---|---|
| 3,391,016 | 7/1968 | McCrary et al. | 427/249 |
| 3,679,475 | 7/1972 | Basche et al. | 427/255.7 |
| 4,045,597 | 8/1977 | Debolt | 427/255.7 |
| 4,239,819 | 12/1980 | Holzl | 427/255.2 |

*Primary Examiner*—Sadie L. Childs
*Attorney, Agent, or Firm*—Fitch, Even, Tabin & Flannery

[57] ABSTRACT

A method of forming a coated article is described. The article is composed of a carbon body having a thermochemically deposited coating which renders the body resistant to oxidation at high temperatures. A volatile gaseous halide of silicon is partially reduced to form a lower halide in a first reaction zone having a first pressure and separated from the body. The lower halide is flowed into a second reaction zone maintained at a pressure lower than the pressure in the first reaction zone. A gaseous alloying agent is introduced into the second reaction zone. The agent includes one or more elements selected from the group consisting of carbon, oxygen, aluminum, and nitrogen. As a consequence, a liquid phase intermediate compound is deposited on the substrate body which is thereafter thermochemically reacted to produce a coating of the silicon alloy. The coating has a non-columnar grain distribution with substantially equiaxial grains of an average diameter of less than one micron and forms a correspondingly fine crack mosaic upon stressing due to differences in thermal coefficients of expansion between the coating and the body. The lower halide and the alloying agent are controlled so as to produce a coating wherein the amount of silicon is substantially in excess of stoichiometry.

3 Claims, No Drawings

METHOD FOR MAKING SELF-PROTECTING CARBON BODIES

This is a division of application Ser. No. 416,628, filed Sept. 10, 1982, now U.S. Pat. No. 4,515,860.

This invention relates to coated articles and, more particularly, to a coated article comprising a body of carbon material in combination with a thermochemically deposited coating having unique properties, and to a method for making such an article.

The use of carbon bodies of monolithic or composite construction is common where very high temperatures (e.g. 1400° C. or higher) are encountered. For example, both monolithic graphite and carbon composite bodies are used in such applications as pump impellers for handling molten metal, electrodes in electrothermal processes, and for many applications in the aerospace industry.

At temperatures above about 500° C., carbon bodies, in an oxidizing atmosphere, may become eroded or otherwise structurally impaired. Accordingly, the prior art is replete with various attempts to provide coatings on carbon bodies to provide oxidation resistance.

There are several major difficulties in connection with such coatings. One is to provide proper adhesion to the carbon body. Carbon bodies depending on the precursor materials from which they are made and, depending on their degree of graphitization, vary greatly as to their coefficient of thermal expansion. The coefficient of thermal expansion may be very different from that of the coating causing problems either in the processing or in the useful operation of the article. It frequently causes cracking in the coating allowing oxidative attack. Another problem is experienced in coating carbon articles which are not fully dense. Surface porosity may cause pin holes in the coating causing poor protective capabilities. Finally, mechanical vibration, imposed stress, or even debris damage may cause cracking of the brittle protective layers.

Attempts to alleviate the foregoing problem have included the provision of so-called conversion coatings. These coatings typically involve coating the carbon body with a diffusion layer in order to provide protection or a gradient in the thermal coefficient of expansion from the carbon body to the outer oxidation resistant coating. Conversion coatings, however, are often difficult and expensive to achieve, and may not provide satisfactory results under extreme conditions, such as very high temperatures or thermal cycling, or extended high temperature operation. Cracks may form allowing oxygen to react with the underlying carbon body.

In order to avoid oxidation through cracks formed in a protective coating, some protection systems have employed a sealant material to fill the cracks. The thermal decomposition of tetraethylorthosilicate produces $SiO_2$ which will act as an oxidation resistant sealant in the cracks. The self-heating characteristics of such prior art coatings, however, are of limited effectiveness, particularly where the width of the cracks is relatively large.

It is an object of the present invention to provide an improved oxidation resistant coating for carbon bodies.

Another object of the invention is to provide a coated carbon body having high oxidation resistance and superior characteristics.

Still another object of the invention is to provide an improved method for manufacturing a carbon body with an oxidation resistant coating.

Other objects of the invention in addition to those described herein will become apparent to those skilled in the art from the following description.

Very generally the coated article of the invention comprises a body of carbon material in monolithic or composite form upon which has been thermochemically deposited a silicon alloy coating comprising one or more alloying elements selected from the group consisting of carbon, oxygen, aluminum and nitrogen. The alloy is in the form silicon carbide, silicon nitride, silicon oxynitride, or a sialon. The alloy coating has a non-columnar grain distribution with substantially equi-axial grains of an average diameter of less than one micron. The amount of silicon in the alloy coating is in excess of stoichiometry to an extent sufficient to confer crack-healing characteristics at temperatures where oxidation protection of carbon is necessary.

More particularly, the body of carbon material of which the coated article is comprised may be any of a number of suitable structural forms of carbon. Such forms may include monolithic graphite, a composite of carbon fibers and carbon matrix, partially or fully graphitized, or any other suitable form of carbon. The structure may, for example, be a turbine part, a pump impeller, a space craft wing edge, or a component of a rocket engine. In any case, the coating of the invention is of particular advantage where the graphite body is subject to oxidation if unprotected.

In accordance with the invention, the body of carbon material is provided with a thermochemically deposited silicon alloy coating. The significance of the thermochemical deposition will be described below. The coating of silicon alloy may be any of a group of alloys known for its high temperature oxidation resistance. This group of silicon alloys includes one or more of the elements carbon, oxygen, aluminum and nitrogen. The alloy is deposited in the form silicon carbide, silicon nitride, silicon oxynitride or a sialon (any of several compounds containing silicon, aluminum, oxygen and nitrogen in various proportions).

The alloy coating employed in the coated article of the invention has a non-columnar grain distribution with substantially equiaxial grains of an average diameter of lss than one micron. Accordingly, once the coating is thermochemically deposited, difference in thermal expansion between the coating and the carbon body may result in microscopic fracturing of the coating. Because of the exceptionally fine grain size and even grain distribution in the coating employed in the invention, an exceptionally fine crack mosaic occurs, minimizing the width of the cracks resulting from the thermal expansion differences.

In order to prevent attack of the carbon body through the microscopic cracks formed in the coating, the coating employed in the invention contains an amount of silicon which is in excess of stoichiometry. The amount of excess is selected to be sufficient to confer crack healing characteristics at the temperatures under which the coated article is to be exposed. Such crack healing characteristics occur because, at temperatures of the order of the melting point of silicon or higher, silicon will flow in elemental form or in the oxide form, weeping into the crack mosaic of the coating and forming an oxidation resistant glass filler. This combination of silicon alloy coating with glass-filled crack mosaic results in exceptionally high oxidation resistance.

Where the coated article is to be utilized at temperatures well below the melting point of silicon as well as at temperatures of the order of the melting point of silicon, such as where cycling of temperature may occur, it is desirable to employ a diffusion layer formed into the body of carbon material under the alloy coating. This diffusion layer is formed utilizing boron and is preferably formed to a depth of at least 1 micron and up to 100 microns. Such a diffusion layer provides low temperature crack healing properties (e.g. of the order of 500° C. to 1000° C.) by forming a boron oxide ($B_2O_3$) which has a melting point of approximately 470° C. This boron oxide will weep into the crack mosaic and, by itself, or after reacting with the excess silicon will provide the desired oxidation resistance at the lower temperatures. Of course, if the coated article is not to be operated at such lower temperatures, the boron diffusion coat may be unnecessary. However, a boron diffusion coat may also provide a gradient in thermal expansion coefficient which will enhance adhesion of the silicon alloy coating.

In order to produce the thermochemically deposited coating on the carbon body, it is preferred that the method described in U.S. Pat. No. 4,239,819 issued Dec. 16, 1980 be employed. In that patent, a method is described for depositing silicon carbide (Examples 11 and 12), silicon nitride (Example 13) silicon oxynitride (Example 16) and sialon (Example 17). Generally, the method utilizes a volatile halide of the semi-metal (silicon) which is partially reduced in a first reaction zone at a first pressure and separated from the substrate. A liquid phase intermediate compound is then deposited on the substrate in the presence of an alloying gas. The alloying gas contains one or more of the elements carbon, oxygen, aluminum, and nitrogen. The liquid phase deposited on the substrate is then thermochemically reacted to produce the hard, fine-grained alloy as described.

As previously mentioned, the grain refinement in the alloy coating is preferably non-columnar, equiaxial and less than about 1 micron average diameter. Preferably, the average diameter is less than 0.1 micron to minimize the width of the cracks to enhance the healing process provided by the excess silicon. The excess of elemental silicon preferably is at least about 5% by weight greater than stoichiometric and may range up to 50% by weight depending on the temperature regime in which the protection is required. Higher temperatures require that less silicon be present whereas lower temperatures permit a greater amount of excess silicon.

The grain refinement is important in conferring the capability on the coating of maintaining the excess silicon during high temperature conditions. With grain refinement substantially more coarse than that of the present invention, materials containing excess silicon tend to form relatively large "lakes" of elemental silicon in a molten state which tend to be lost from the coatings. Because of the fine mosaic of cracks in the present invention, the surface tension of the molten silicon or silicon oxide tends to maintain the material in the cracks, improving the oxidation resistance.

The following examples are provided by way of illustration only, and the invention is not intended to be limited to such examples:

EXAMPLE I

This example illustrates the process of depositing silicon carbide coating containing excess silicon on a graphite substrate. The deposition was carried out in a reactor system like that illustrated and described in above-cited U.S. Pat. No. 4,239,819. A gas mixture composed of methyltrichlorosilane ($CH_3Cl_3Si$), silicon tetrachloride ($SiCl_4$), hydrogen, nitrogen and argon were introduced into a reaction chamber at the individual flow rates shown in Table I, expressed therein in cc/min. at 20° C. The table also indicates the percentages of individual gases in the mixture. The temperature of the gases within the chamber were maintained at between 600° and 775° C. The graphite substrate in the reactor was heated to between 1070° and 1140° C. by inductive heating. The system pressure was between 90 and 110 Torr.

TABLE I

| Gas | Flow Rate | % of Total Gas |
|---|---|---|
| $CH_3Cl_3Si$ | 900–1935 | 4.5–5.1 |
| $SiCl_4$ | 0–200 | 0–0.8 |
| $H_2$ | 10–19.5 | 49.6–51.7 |
| $N_2$ | 6850–16000 | 34.7–42.4 |
| Ar | 0–2000 | 0–10.1 |

The total reaction time was 60 minutes, during which the gas velocity in the reactor was maintained between 5099 and 18506 cm per munute. The deposition layer on the substrate was between about 75 and 125 micrometers, and had a hardness measured at between about 1200 and 2200 Kg/mm$^2$.

EXAMPLE II

The process of Example I was repeated using a substrate which was first treated to diffuse elemental boron into the surface of the body, prior to the application of a silicon alloy overcoat. The diffusion layer was produced by reacting a graphite substrate with a mixture of gases composed of boron trichloride ($BCl_3$), hydrogen, hydrochloric acid and argon in the proportions, and at the flow rates (in cc/min. at 20° C.) shown below in Table II. The gas temperature was maintained between room temperature and 800° C.; the substrate was heated to about 1450° C. The system pressure being held between about 70 and 110 Torr.

TABLE II

| Gas | Flow Rate | % of total gas |
|---|---|---|
| $BCl_3$ | 440–1500 | 2.4–14.5 |
| $H_2$ | 200–6000 | 6.6–15.8 |
| HCl | 400–7400 | 11.9–19.5 |
| Ar | 2000–32000 | 60.7–76.2 |

The reaction was carried out for 60 minutes with the total gas velocity being maintained between about 4500 and 12000 cm/minute. A layer of between 5 and 25 microns was formed in the substrate surface. The silicon carbide deposit was then produced as in Example I with comparable results.

EXAMPLE III

A graphite substrate was coated with a silicon nitride deposit under deposition conditions similar to those described in Example I. The mixture of gases was composed of silicon tetrachloride, ammonia, nitrogen, and hydrogen at the flow rates (in cc/min. at 20° C.) and in the percentages shown in Table III below. The temperature of the gas mixture was maintained between about 500° and 700° C., and the substrate, at between 1350° and 1550° C. The system pressure was held between about 65 and 70 Torr.

TABLE III

| Gas | Flow Rate | % of total gas |
|---|---|---|
| SiCl$_4$ | 270 | 0.6 |
| NH$_3$ | 540 | 1.2 |
| N$_2$ | 35000 | 79.5 |
| H$_2$ | 8240 | 18.7 |

The reaction was carried out for a total of 90 minutes. The deposited overcoat thickness was about 175 microns, and the coated substrate had a hardness of between about 2600 and 3000 Kg/mm$^2$. Silicon oxynitride deposits may be produced under similar conditions, by addition of an amount of water vapor equal, approximately, to the amount of ammonia.

EXAMPLE IV

A graphite substrate was coated with a sialon deposit in a reaction system like that described in Examples I and III. A gas mixture composed of ammonia, hydrogen, nitrogen, silicon tetrachloride and aluminum chloride (AlCl$_3$) having the various flow rates (in cc/min.), shown in Table III below was introduced into the reaction chamber. Gas temperature was maintained between about 600° C. and 750° C., with the substrate being heated to about 1300° C. The system pressure was set at about 40 Torr.

TABLE IV

| Gas | Flow Rate |
|---|---|
| NH$_3$ | 400 |
| H$_2$ | 800 |
| N$_2$ | 560 |
| SiCl$_4$ | 200 |
| AlCl$_3$ | 200 |

The deposition reaction was carried out for 60 minutes, producing a deposit on the substrate having a thickness of about 12 microns.

It may be seen, therefore, that the invention provides a coated article comprising a carbon body upon which has been deposited on oxidation resistant coating of very high effectiveness and integrity. Articles produced in accordance with the invention have ample oxidation resistance for hours in air at temperatures up to 1400° C. Protection is also possible for shorter times at substantially higher temperatures.

Various modifications of the invention in addition to those shown and described herein will become apparent to those skilled in the art from the foregoing description. Such modifications are intended to fall within the scope of the appended claims.

What is claimed is:

1. A method for coating a body of carbon material to provide an oxidation resistant silicon alloy coating, comprising, providing a volatile gaseous halide of silicon, partially reducing said halide to form a lower halide of silicon in a first reaction zone, said first reaction zone having a first pressure and separated from said substrate, flowing said lower halide into a second reaction zone maintained at a pressure lower than the pressure in said first reaction zone, providing in said second reaction zone a gaseous alloying agent including one or more elements selected from the group consisting of carbon, oxygen, aluminum and nitrogen, depositing a liquid phase intermediate compound on said substrate body and thermochemically reacting said liquid phase to produce a coating of silicon alloy having a non-columnar grain distribution with substantially equiaxial grains of an average diameter of less than one micron, thereby forming a correspondingly fine crack mosaic upon stressing due to differences in thermal coefficients of expansion between the coating and the body, said lower halide and said alloying agent being controlled so as to produce a coating wherein the amount of silicon is substantially in excess of stoichiometry.

2. A method according to claim 1 wherein the silicon is between 5% and 50% by weight in excess of stoichiometry.

3. A method according to claim 1 wherein a diffusion layer of boron is formed on said carbon body prior to deposition of said silicon alloy.

* * * * *